United States Patent
Jung et al.

(10) Patent No.: US 10,986,298 B2
(45) Date of Patent: Apr. 20, 2021

(54) CORRELATED DOUBLE SAMPLING CIRCUIT, AN IMAGE SENSOR, AND A METHOD FOR VARYING OUTPUT SIGNALS IN A CORRELATED DOUBLE SAMPLING CIRCUIT

(71) Applicant: SAMSUNG ELECTRONICS CO., LTD., Suwon-si (KR)

(72) Inventors: Yun Hwan Jung, Hwaseong-si (KR); Sun Yool Kang, Hwaseong-si (KR); Kyung Tae Kim, Suwon-si (KR); Hee Sung Chae, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 5 days.

(21) Appl. No.: 16/657,164

(22) Filed: Oct. 18, 2019

(65) Prior Publication Data
US 2020/0260036 A1    Aug. 13, 2020

(30) Foreign Application Priority Data
Feb. 11, 2019  (KR) .......................... 10-2019-0015566

(51) Int. Cl.
*H04N 5/378*  (2011.01)

(52) U.S. Cl.
CPC .................................. *H04N 5/378* (2013.01)

(58) Field of Classification Search
None
See application file for complete search history.

(56) References Cited

U.S. PATENT DOCUMENTS

| | | | |
|---|---|---|---|
| 5,771,204 A * | 6/1998 | Froggatt | G01S 7/52025 367/97 |
| 7,336,214 B2 | 2/2008 | Krymski | |
| 2007/0002941 A1* | 1/2007 | Low | G06F 1/12 375/229 |
| 2012/0262244 A1* | 10/2012 | Terasawa | H03L 1/022 331/167 |
| 2013/0243147 A1* | 9/2013 | Kim | H03M 1/0863 377/42 |
| 2014/0266309 A1 | 9/2014 | Jakobson | |
| 2014/0293104 A1 | 10/2014 | Tanaka et al. | |
| 2016/0366359 A1 | 12/2016 | Lee et al. | |
| 2017/0064233 A1 | 3/2017 | Matsumoto | |
| 2017/0201086 A1* | 7/2017 | Chen | H02H 3/08 |
| 2018/0063457 A1 | 3/2018 | Shimamura et al. | |
| 2018/0160065 A1 | 6/2018 | Aoki | |
| 2018/0198996 A1 | 7/2018 | Ha et al. | |

\* cited by examiner

*Primary Examiner* — Cynthia Segura
(74) *Attorney, Agent, or Firm* — F. Chau & Associates, LLC

(57) ABSTRACT

A correlated double sampling (CDS) circuit including a comparator, the comparator including: a signal input unit including a first transistor configured to receive a ramp signal and a second transistor configured to receive a pixel signal; and an offset generator unit connected to the signal input unit, the offset generator unit including at least two transistors, wherein in the offset generator unit, an aspect ratio of the at least two transistors in an auto-zeroing period and an aspect ratio of the at least two transistors in a pixel signal decoding period are different from each other.

20 Claims, 17 Drawing Sheets

CORRELATED DOUBLE SAMPLING CIRCUIT, AN IMAGE SENSOR, AND A METHOD FOR VARYING OUTPUT SIGNALS IN A CORRELATED DOUBLE SAMPLING CIRCUIT

CROSS-REFERENCE TO RELATED APPLICATION

This application claims priority under 35 U.S.C. § 119 to Korean Patent Application No. 10-2019-0015566 filed on Feb. 11, 2019 in the Korean Intellectual Property Office, the disclosure of which is incorporated by reference herein in its entirety.

1. TECHNICAL FIELD

Exemplary embodiments of the present inventive concept relate to a correlated double sampling (CDS) circuit, an image sensor including the same, and a method for varying output signals in a CDS circuit.

2. DESCRIPTION OF RELATED ART

An image sensor may employ a correlated double sampling (CDS) scheme. CDS is a method to measure electrical values such as voltages or currents that allows for removing an undesired offset. The image sensor outputs digital signals by counting the difference between signals sampled in a CDS scheme, fir example, between reset signals and pixel signals.

In a high-resolution product, a CDS circuit processes a lame amount of pixel signals. However, when sampling times are clustered in a short time period, the CDS circuit consumes an excessive amount of current instantaneously. When this happens, VDD and TSS voltages applied to the CDS circuit may experience IR-drop/rise phenomena.

Such IR-drop/rise phenomena in a CDS circuit may reduce a noise margin, which can slow down the processing speed of an image sensor or prevent signal processing on certain pixels from being performed properly.

SUMMARY

According to an exemplary embodiment of the present inventive concept, a correlated double sampling (CDS) circuit includes a comparator, the comparator including: a signal input unit including a first transistor for receiving a ramp signal and a second transistor for receiving a pixel signal; and an offset generator unit connected to the signal input unit, the offset generator unit including at least two transistors. In the offset generator unit, an aspect ratio of the at least two transistors in an auto-zeroing period and an aspect ratio of the at least two transistors in a pixel signal decoding period may be different from each other.

According to an exemplary embodiment of the present inventive concept, an image sensor includes: a pixel array including a plurality of pixels, each of the plurality of pixels for outputting a pixel signal; a ramp signal generator outputting for a ramp signal; and a CDS circuit. The CDS circuit includes a comparator, and the comparator includes a first transistor for receiving the ramp signal and a second transistor for receiving at least one of the pixel signals, and a third transistor connected to the first transistor or the second transistor. An aspect ratio of the third transistor in a first period and an aspect ratio of the third transistor in a second period may be different from each other.

According to an exemplary embodiment of the present inventive concept, an image sensor includes: a pixel array including a plurality of pixels connected to a plurality of column lines; a ramp signal generator for outputting a ramp signal; a CDS circuit unit connected to each of the plurality of column lines, and configured to compare a pixel signal output from the pixel array to the ramp signal, and to output a compared output signal according to a result of the comparison; and a signal delay unit configured to provide a different signal delay for each of at least two column lines among the plurality of column lines.

According to an exemplary embodiment of the present inventive concept, there may be provided a method for varying output signals in a CDS circuit that includes a signal input unit including at least two transistors and configured to receive a ramp signal and a pixel signal, and an offset generator unit including at least two transistors and connected to the signal input unit, the method including: forming a first aspect ratio of the at least two transistors included in the offset generator unit to perform an auto-zeroing; storing an offset component generated by the auto-zeroing; and forming a second aspect ratio of the at least two transistors included in the offset generator unit to perform a signal decoding, the second aspect ratio being different from the first aspect ratio.

According to an exemplary embodiment of the present inventive concept, there is provided a CDS circuit including a comparator, wherein the comparator includes: a first circuit including a first transistor to receive a ramp signal and a second transistor to receive a pixel signal; and a second circuit including a third transistor connected to the first transistor and a fourth transistor connected to the second transistor, wherein an aspect ratio of the third and fourth transistors in an auto-zeroing period and an aspect ratio of the third and fourth transistors in a pixel signal decoding period are different from each other.

BRIEF DESCRIPTION OF DRAWINGS

The above and other features of the present inventive concept will be more clearly understood by describing in detail exemplary embodiments thereof with reference to the accompanying drawings, in which.

DETAILED DESCRIPTION OF THE EMBODIMENTS

Figure 1:
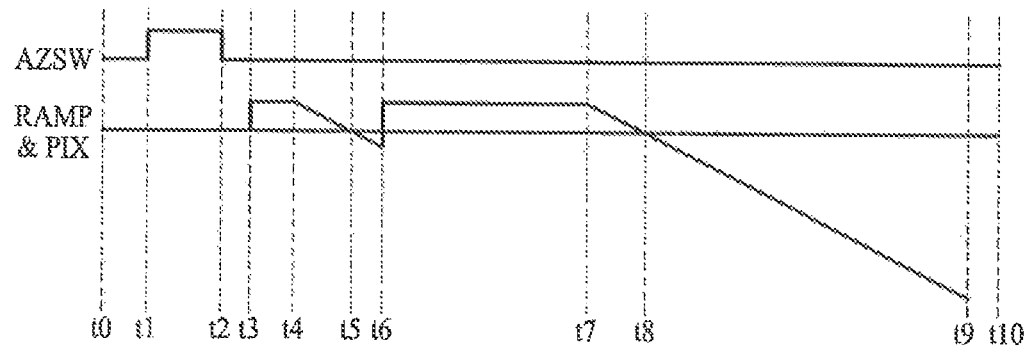
FIG. 1 is a timing diagram illustrating operations of a correlated double sampling (CDS) circuit.

Hereinafter, exemplary embodiments of the present inventive concept will be described with reference to the accompanying drawings. In the drawings, like reference numerals may refer to like elements.

Figure 2:
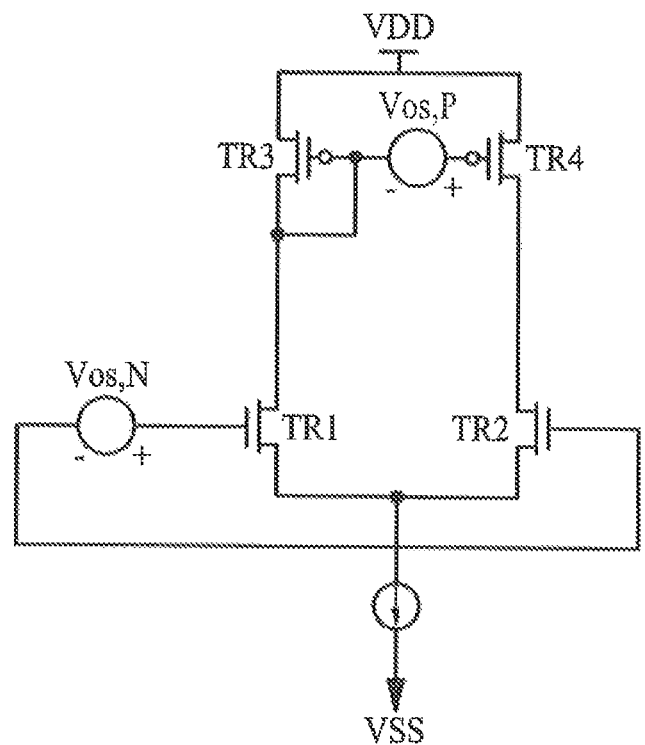
FIGS. 2, 3 and 4 are circuit diagrams illustrating operations of a CDS circuit.
Figure 3:
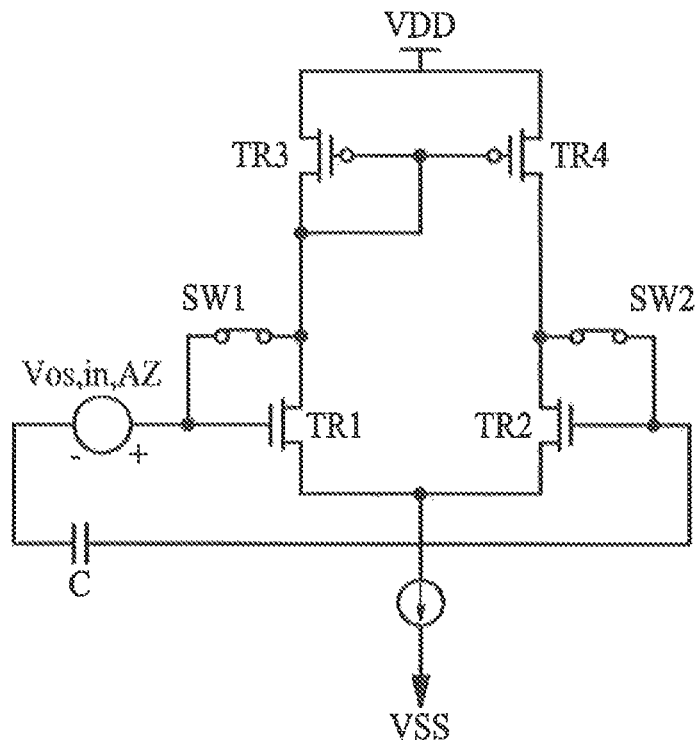
Figure 4:
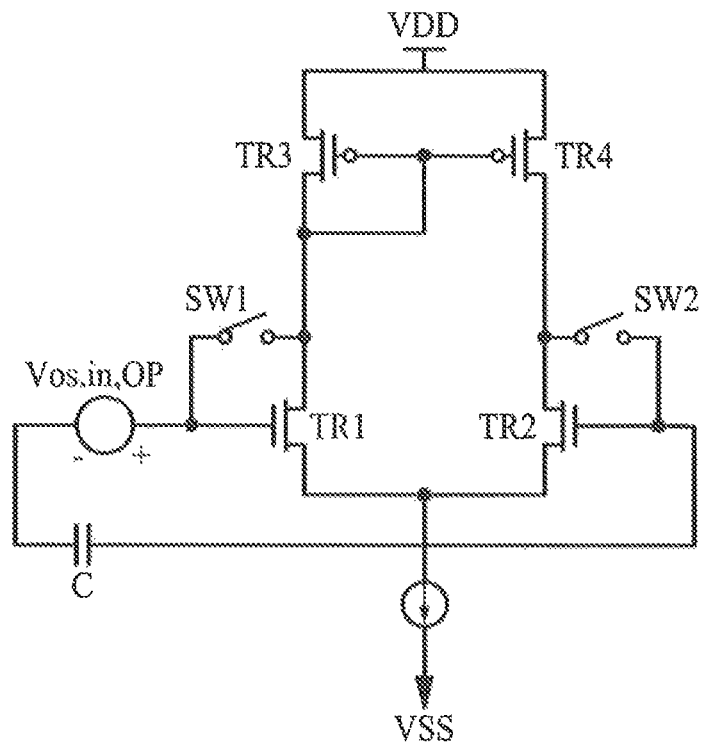

FIG. 1 is a timing diagram illustrating operations of a correlated double sampling (CDS) circuit, and FIG. 2 to FIG. 4 are circuit diagrams illustrating operations of a CDS circuit. In the figures, VDD and VSS may refer to positive power supply voltage and ground voltage, respectively. In FIG. 2, Vos,N may refer to a negative offset voltage and Vos,P may refer to a positive offset voltage.

Referring to FIG. 2, the CDS circuit includes a comparator and peripheral circuits. For example, the comparator includes a first transistor TR1 for receiving a ramp signal RAMP, a second transistor TR2 for receiving a pixel signal, a third transistor TR3 connected to the first transistor TR1, and a fourth transistor TR4 connected to the second transistor TR2, in addition, referring to FIG. 3 and FIG. 4, the CDS circuit may include, as peripheral circuits, a first switch SW1, a second switch SW2, and a capacitor C.

The comparator compares a pixel signal PIX to a ramp signal RAMP, and outputs a compared signal COMP corresponding to a result of the comparison. However, before performing these operations, an auto-zeroing is performed, to remove offsets of the comparator. To describe this process with reference to FIG. 3, FIG. 4, and the timing diagram illustrated in FIG. 1, an operation in which the first switch SW1 and the second switch SW2 are switched on in FIG. 3 corresponds to a waveform AZSW illustrated in an interval between t1 and t2 in FIG. 1.

An offset voltage that is obtained by performing an auto-zeroing is expressed by Equation 1 below.

$$V_{OS,AZ} = \left\{ \frac{V_{GSN} - V_{THN}}{2} \left[ \frac{\Delta(W/L)_N}{(W/L)_N} \right] + \Delta V_{THN} \right\} + \left\{ \frac{|V_{GSP} - V_{THP}|}{2} \left[ \frac{\Delta(W/L)_{P,AZ}}{(W/L)_{P,AZ}} \right] + \Delta V_{THP} \right\} \frac{g_{mP,AZ}}{g_{mN}} \quad \text{[Equation 1]}$$

In Equation 1 above, $V_{OS,AZ}$ represents an offset voltage when performing an auto-zeroing, $V_{GSN}$ represents a gate-source voltage of an n-type metal oxide semiconductor (NMOS) transistor illustrated in FIG. 2 to FIG. 4, and $V_{GSP}$ represents a gate-source voltage of a p-type metal oxide semiconductor (PMOS) transistor illustrated in FIG. 2 to FIG. 4.

$V_{THN}$ represents a threshold voltage of the NMOS transistor illustrated in FIG. 2 to FIG. 4, and $V_{THP}$ represents a threshold voltage of the PMOS transistor illustrated in FIG. 2 to FIG. 4. In addition, $\Delta V_{THN}$ represents a threshold voltage mismatch of the first transistor TR1 and the second transistor TR2, and $\Delta V_{THP}$ represents a threshold voltage mismatch of the third transistor TR3 and the fourth transistor TR4.

W/L is an aspect ratio of a transistor, which represents a width W to length L ratio of a transistor channel region. $(W/L)_N$ represents aspect ratios of the first transistor TR1 and the second transistor TR2, and $(W/L)_{P,AZ}$ represents aspect ratios of the third transistor TR3 and the fourth transistor TR4. In addition, $\Delta(W/L)_N$ represents an aspect ratio mismatch of the first transistor TR1 and the second transistor TR2, and $\Delta(W/L)_{P,AZ}$ represents an aspect ratio mismatch of the third transistor TR3 and the fourth transistor TR4.

In addition, $g_{mN}$ represents a transconductance of the first transistor TR1 and the second transistor TR2, and $g_{mP,AZ}$ represents a transconductance of the third transistor TR3 and the fourth transistor TR4.

In Equation 1, as described above, the offSet voltage $V_{OS,AZ}$ when performing an auto-zeroing is expressed as a sum of two terms, where the first term represents an offset generated by the first transistor TR1 and the second transistor TR2, and the second term represents an offset generated by the third transistor TR3 and the fourth transistor TR4. In addition, according to a conventional CDS circuit described above, the offset voltage when performing an auto-zeroing, $V_{OS,AZ}$, and the offset voltage when decoding pixel signals, $V_{OS,OP}$, are identical to each other. Therefore, a final offset voltage $V_{OS,OP}-V_{PS,AZ}$, equals 0, and accordingly, by performing an auto-zeroing, the process of decoding pixel signals may not be affected by offset voltages of the comparator.

However, during a process of decoding pixel signals, in particular when decoding reset signals (t5 in FIG. 1), a peak current may flow instantaneously. Since there is no light entering the image sensor when reset signals are decoded, the decoding is performed on one particular color, typically a black color, for example. Therefore, the peak current may be instantaneously consumed, and accordingly, VDD and VSS voltages applied on a data bus may experience an IR-drop/rise phenomena. Such IR-drop/rise phenomena may be more severe for high-resolution products having a relatively large amount of pixel signals to decode.

To address such IR-drop/rise phenomena inside the data bus, caused by the peak current, a decoupling capacitor may be installed. This may lessen the impact of the IR-drop/rise phenomena to a certain degree; however, the decoupling capacitor may increase the surface area of the CDS circuit. In addition, a peak current and an IR-drop caused by the peak current may not be easily compensated, since the peak current may be generated by an inductance component that exists on a path for refilling the decoupling capacitor with charges after it has instantaneously consumed a large quantity of charges.

According to exemplary embodiments of the present inventive concept, there is provided a method for varying signal decoding times to prevent current peaking and a subsequent IR-drop/rise in voltage inside a data bus.

Figure 5:
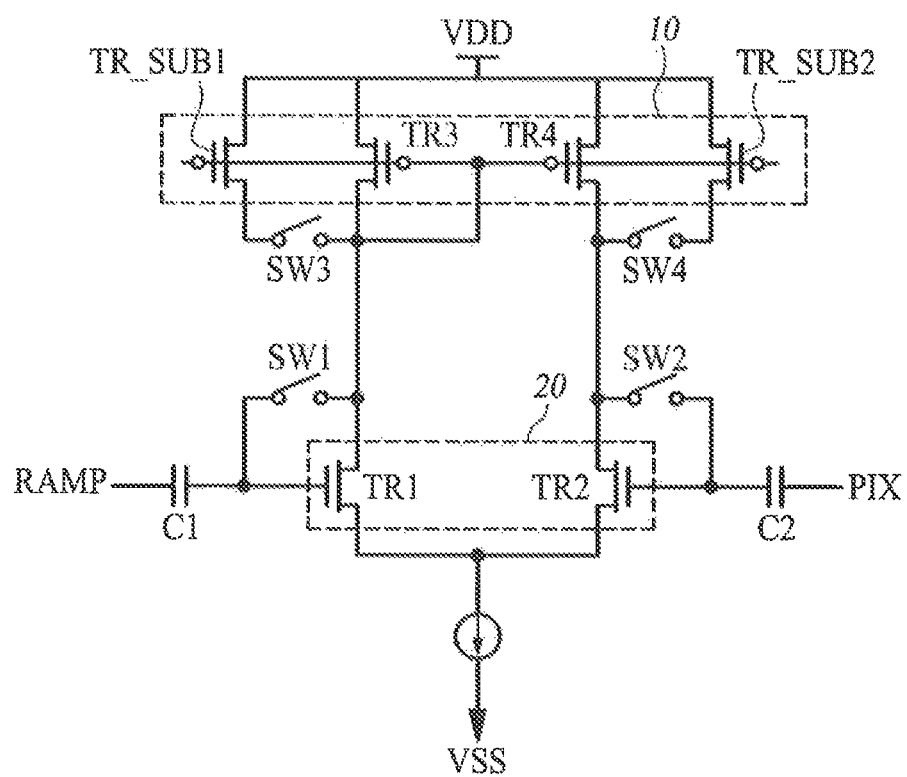
FIG. 5 is a circuit diagram illustrating a CDS circuit according to an exemplary embodiment of the present inventive concept.

FIG. 5 is a circuit diagram illustrating a CDS circuit according to an exemplary embodiment of the present inventive concept, and FIG. 6 to FIG. 9 are circuit diagrams illustrating operations of a CDS circuit according to an exemplary embodiment of the present inventive concept.

Referring to FIG. 5, the CDS circuit according to an exemplary embodiment of the present inventive concept includes a comparator, and the comparator includes a signal input unit (20) and an offset generator unit (10).

The signal input unit (20) includes a first transistor TR1 for receiving ramp signals RAMP and a second transistor TR2 for receiving pixel signals PIX. The first transistor TR1 may be connected to a first capacitor C1 and the second transistor TR2 may be connected to a second capacitor C2.

The offset generator unit (10) includes transistors, and these transistors are connected to the signal input unit (20). The transistors of the offset generator unit 10 may be connected to third and fourth switches SW3 and SW4. Furthermore, the CDS circuit according to the present embodiment is controlled such that the transistors included in the offset generator unit 10 have an aspect ratio in an auto-zeroing period and an aspect ratio in a pixel signal decoding period that are different from each other.

Still referring to FIG. 5, the offset generator unit 10 may include a third transistor TR3 connected to the first transistor TR1, and a fourth transistor TR4 connected to the second transistor TR2. The offset generator unit 10 may also include a first auxiliary transistor TR_SUB1 connected in parallel to the third transistor TR3, and a second auxiliary transistor TR_SUB2 connected in parallel to the fourth transistor TR4. In addition, a comparison node of the comparator is formed at a point where the first transistor TR1 and the third transistor TR3 are connected, and an output node of the comparator is formed at a point where the second transistor TR2 and the fourth transistor TR4 are connected.

The CDS circuit according to the present embodiment is controlled such that, in the auto-zeroing period, the first auxiliary transistor TR_SUB1 and the second auxiliary transistor TR_SUB2 are switched on as well as the third transistor TR3 and the fourth transistor TR4, Subsequently, in the pixel signal decoding period, the CDS circuit is controlled such that the third transistor TR3 and the fourth transistor TR4 are switched on while the first and second auxiliary transistors TR_SUB1 and TR_SUB2 are switched off.

However, when the CDS circuit is controlled as described above, an offset voltage value of the offset generator unit 10 in the auto-zeroing period and an offset voltage value of the offset generator unit 10 in the pixel signal decoding period are different from each other. In this case, an offset voltage is not removed. This can be delineated with reference to Equation 2, Equation 3, and Equation 4 below.

Equation 2 produces an offset voltage in an auto-zeroing period when the third transistor TR3, the fourth transistor TR4, the first auxiliary transistor TR_SUB1, and the second auxiliary transistor TR_SUB2 are all switched on in the CDS circuit according to an example embodiment of the present inventive concept.

$$V_{OS,AZ} = \left\{ \frac{V_{GSN} - V_{THN}}{2} \left[ \frac{\Delta(W/L)_N}{(W/L)_N} \right] + \Delta V_{THN} \right\} + \left\{ \frac{|V_{GSP,AZ} - V_{THP}|}{2} \left[ \frac{\Delta(W/L)_{P,AZ}}{(W/L)_{P,AZ}} \right] + \Delta V_{THP,AZ} \right\} \frac{g_{mP,AZ}}{g_{mN}}$$

[Equation 2]

In this case, $V_{OS,AZ}$ represents an offset voltage in an auto-zeroing period when the third transistor TR3, the fourth transistor TR4, the first auxiliary transistor TR_SUB1, and the second auxiliary transistor TR_SUB2 are all switched on according to an exemplary embodiment of the present inventive concept; $V_{GSN}$ represents a gate-source voltage of NMOS transistors illustrated in FIG. 5; and $V_{GSP,AZ}$ illustrates a gate-source voltage at which the third transistor TR3, the fourth transistor TR4, the first auxiliary transistor TR_SUB1, and the second auxiliary transistor TR_SUB2, operate.

$V_{THN}$ represents a threshold voltage at which the first transistor TR1 and the second transistor TR2 illustrated in FIG. 5 operate, and $V_{THP}$ represents a threshold voltage at which the third transistor TR3, the fourth transistor TR4, the first auxiliary transistor TR_SUB1, and the second auxiliary transistor TR_SUB2 illustrated in FIG. 5 operate. In addition, $\Delta V_{THN}$ represents a threshold voltage mismatch of the first transistor TR1 and the second transistor TR2, and $\Delta V_{THP,AZ}$ represents a threshold voltage mismatch of the third transistor TR3, the fourth transistor TR4, the first auxiliary transistor TR_SUB1, and the second auxiliary transistor TR_SUB2.

$(W/L)_N$ represents an aspect ratio of the first transistor TR1 and the second transistor TR2, and $(W/L)_{P,AZ}$ represents an aspect ratio of the third transistor TR3, the fourth transistor TR4, the first auxiliary transistor TR_SUB1, and the second auxiliary transistor TR_SUB2. In addition, $\Delta(W/L)_N$ represents an aspect ratio mismatch of the first transistor TR1 and the second transistor TR2, and $\Delta(W/L)_{P,AZ}$ represents an aspect ratio mismatch of the third transistor TR3, the fourth transistor TR4, the first auxiliary transistor TR_SUB1, and the second auxiliary transistor TR_SUB2.

In addition, $g_{mN}$ represents a transconductance of the first transistor TR1 and the second transistor TR2, and $g_{mP,AZ}$ represents a transconductance of the third transistor TR3, the fourth transistor TR4, the first auxiliary transistor TR-SUB1, and the second auxiliary transistor TR_SUB2.

Equation 3 produces an offset voltage in a pixel signal decoding period when only the third transistor TR3 and the fourth transistor TR4 are switched on in the CDS circuit according to an exemplary embodiment of the present inventive concept.

$$V_{OS,OP} = \left\{ \frac{V_{GSN} - V_{THN}}{2} \left[ \frac{\Delta(W/L)_N}{(W/L)_N} \right] + \Delta V_{THN} \right\} + \left\{ \frac{|V_{GSP,OP} - V_{THP}|}{2} \left[ \frac{\Delta(W/L)_{P,OP}}{(W/L)_{P,OP}} \right] + \Delta V_{THP,OP} \right\} \frac{g_{mP,OP}}{g_{mN}}$$

[Equation 3]

In Equation 3, $V_{OS,OP}$ represents an offset voltage in the pixel signal decoding period, and $V_{GSP,OP}$ represents a gate-source voltage of the third transistor TR3 and the fourth transistor TR4, when the third transistor TR3 and the fourth transistor TR4 are switched on according to an exemplary embodiment of the present inventive concept.

$(W/L)_{P,OP}$ represents an aspect ratio of the third transistor TR3 and the fourth transistor TR4; $\Delta(W/L)_{P,OP}$ represents an aspect ratio mismatch of the third transistor TR3 and the fourth transistor TR4; and $g_{mP,OP}$ represents a transconductance of the third transistor TR3 and the fourth transistor TR4. Other parameters in Equation 3 may be referred to in the description of Equation 2.

Equation 4 produces a final offset voltage. When the embodiment illustrated in FIG. 5 is applied, as shown in Equation 4, the final offset voltage can be expressed as a difference produced by subtracting an offset voltage in the auto-zeroing period from an offset voltage in the pixel signal decoding period.

$$V_{OS} = V_{OS,OP} - V_{OS,AZ} = \frac{I_D}{g_{mN}} \left\{ \left[ \frac{\Delta(W/L)_{P,AZ}}{(W/L)_{P,AZ}} \right] - \left[ \frac{\Delta(W/L)_{P,OP}}{(W/L)_{P,OP}} \right] + \frac{2\Delta V_{THP,AZ}}{(W/L)_{P,AZ}} - \frac{2\Delta V_{THP,OP}}{(W/L)_{P,OP}} \right\}$$

[Equation 4]

Referring to Equations 2 to 4, offset components existing in the signal input unit 20 are excluded from final offset components. In addition, the offset components existing in the offset generator unit 10 remain in the final offset components. In other words, this case is different from a case where the CDS circuit illustrated in FIG. 2 to FIG. 4 is applied, and the final offset voltage equals zero.

According to an exemplary embodiment of the present inventive concept, sizes of the transistors included in the offset generator unit 10, e.g., their aspect ratios W/L, may be varied such that the final offset components remain.

In order to perform such a control described above, the CDS circuit according to an exemplary embodiment of the present inventive concept further includes a first switch SW1 for connecting a gate of the first transistor TR1 to a comparison node of the comparator, and a second switch SW2 for connecting a gate of the second transistor TR2 to an output node of the comparator. A start time and an end time of the auto-zeroing period may be determined based on on/off switching operations of the first switch SW1 and the second switch SW2.

Referring to FIG. 6 to FIG. 9, processes in which the CDS circuit according to an exemplary embodiment of the present inventive concept is operated will be described in greater detail.

Referring to FIG. 6 to FIG. 9, the CDS circuit according to an exemplary embodiment of the present inventive concept may further include a first capacitor C1 connected to the gate of the first transistor TR1 and a second capacitor C2 connected to the gate of the second transistor TR2. In addition, when the auto-zeroing period ends, at least one of the first capacitor C1 and the second capacitor C2 may store offset components formed by the third transistor TR3, the fourth transistor TR4, the first auxiliary transistor TR_SUB1, and the second auxiliary transistor TR_SUB2. A node INP is located between the first transistor TR1 and the first capacitor C1 and a node INN is located between the second transistor TR2 and the second capacitor C2. A node OUTN is located between the first transistor TR1 and the third transistor TR3 and a node OUTP is located between the second transistor TR2 and the fourth transistor TR4.

Figure 6:
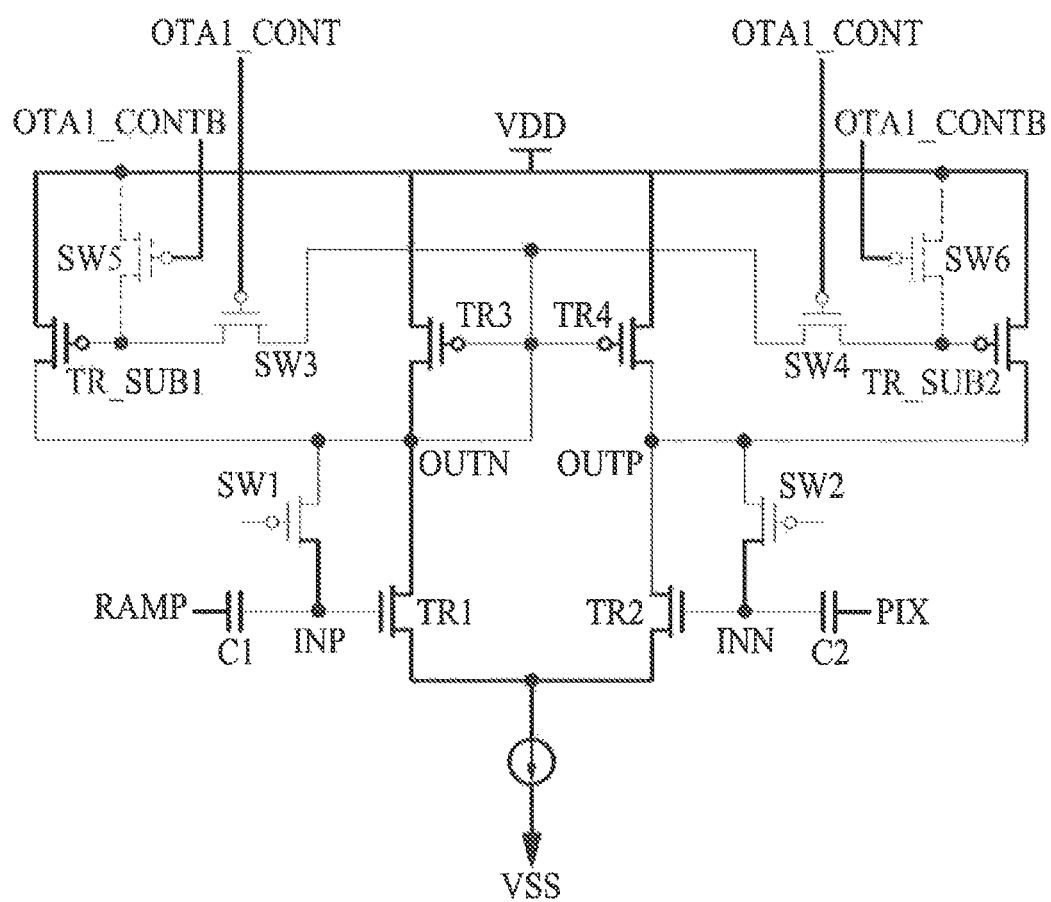
FIGS. 6, 7, 8 and 9 are circuit diagrams illustrating operations of a CDS circuit according to an exemplary embodiment of the present inventive concept.
Figure 7:
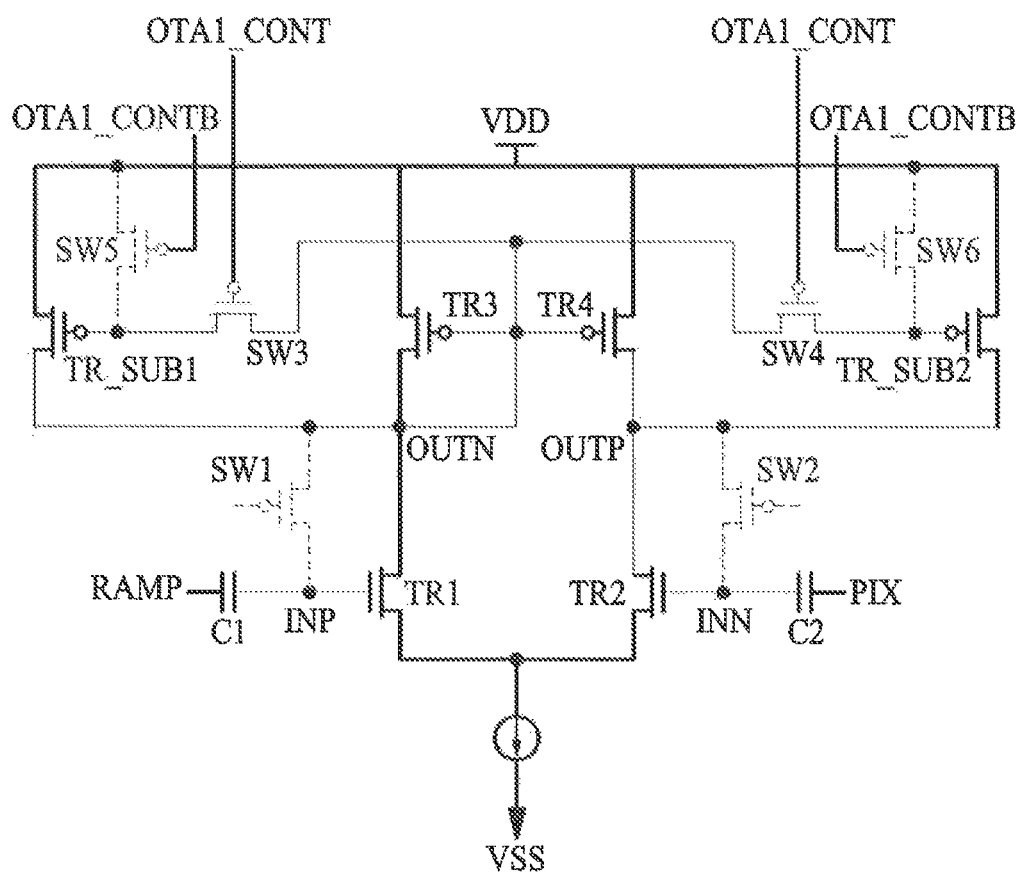
Figure 8:
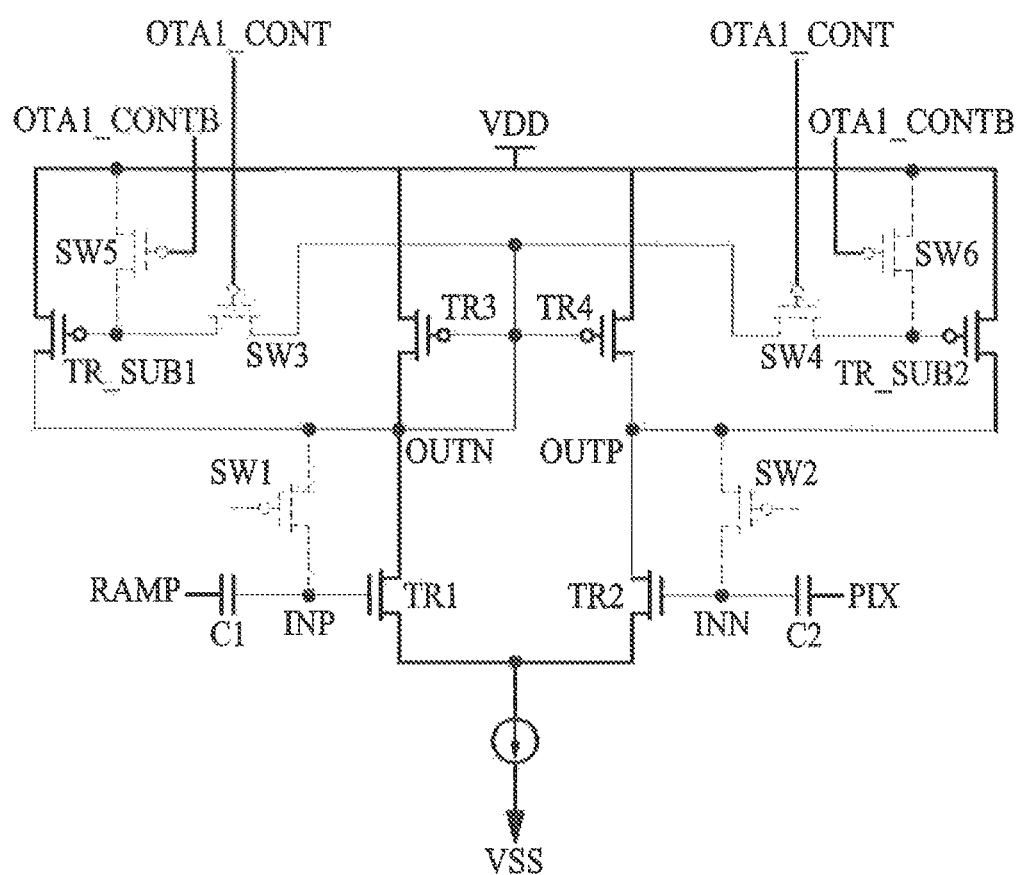
Figure 9:
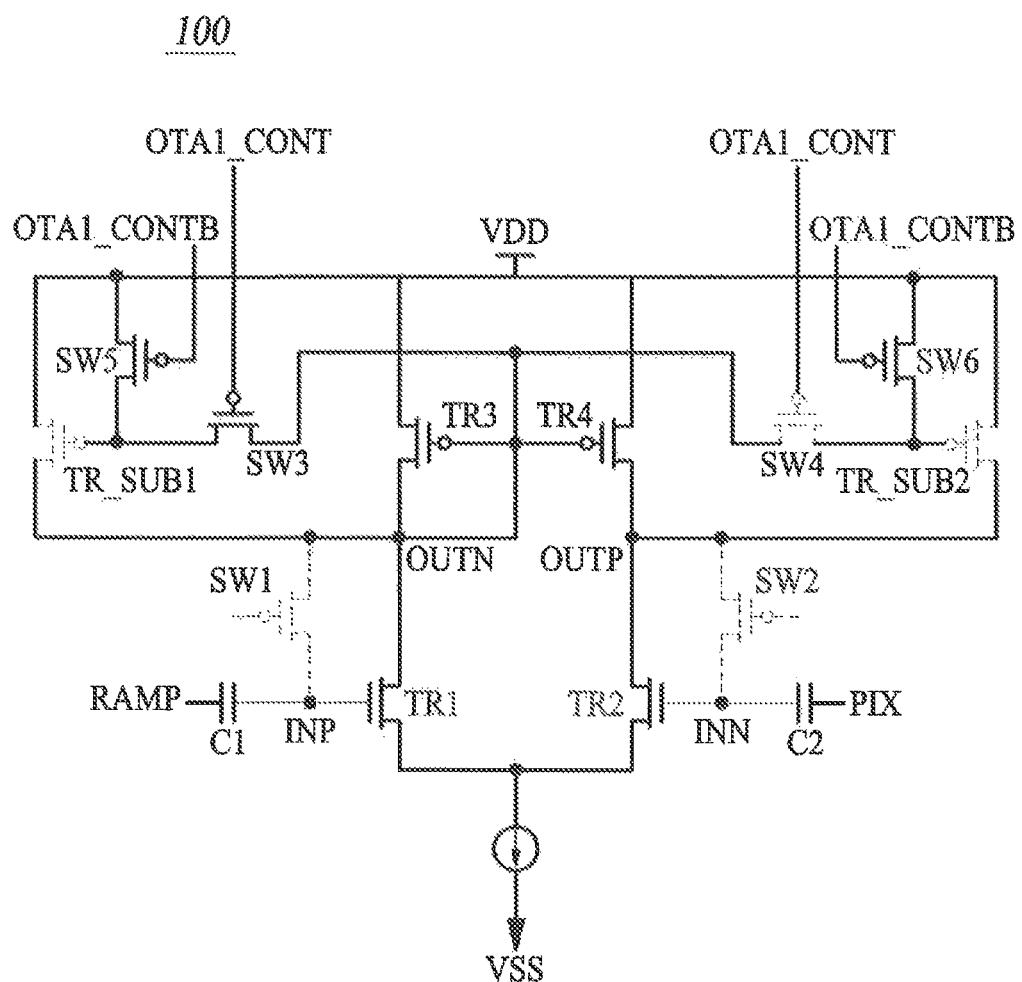

Referring to FIG. 6 to FIG. 9, the CDS circuit according to an exemplary embodiment of the present inventive concept may further include a third switch SW3 for connecting a gate terminal of the third transistor TR3 and a gate terminal of the first auxiliary transistor TR_SUB1, and a fourth switch SW4 for connecting a gate terminal of the fourth transistor TR4 and a gate terminal of the second auxiliary transistor TR_SUB2. The third switch SW3 and the fourth switch SW4 are switched on within the auto-zeroing period (FIG. 6) and switched off when the auto-zeroing period ends (FIG. 8 and FIG. 9). A gate of the third switch SW3 is provided with a signal OTA1_CONT and a gate of the fourth switch SW4 is provided with the signal OTA1_CONT.

As illustrated in FIG. 6, when the first switch SW1 and the second switch SW2 are switched on and the auto-zeroing period starts, the third switch SW3 and the fourth switch SW4 are switched on as well, thereby controlling the first auxiliary transistor TR_SUB1 and the second auxiliary transistor TR_SUB2 to be in a switched-on state.

As illustrated in FIG. 7, when the first switch SW1 and the second switch SW2 are switched off and the auto-zeroing period ends, mismatch offsets of the third transistor TR3, the first auxiliary transistor TR_SUB1, and the second auxiliary transistor TR_SUB2, which were in the switched-on state in the auto-zeroing period, are stored in at least one of the first capacitor C1 and the second capacitor C2.

The CDS circuit according to an exemplary embodiment of the present inventive concept may further include a fifth switch SW5 for connecting a gate terminal of the first auxiliary transistor TR_SUB1 to a voltage source VDD of the comparator, and a sixth switch SW6 for connecting a gate terminal of the second auxiliary transistor TR_SUB2 to the voltage source VDD of the comparator. A gate of the fifth switch SW5 is provided with a signal OTA1_CONTB and a gate of the sixth switch SW6 is provided with the signal OTA1_CONTB.

As illustrated in FIG. 8, when the first switch SW1 and the second switch SW2 are switched off and the auto-zeroing period ends, the third switch SW3 and the fourth switch SW4 are switched off as well, and the third transistor TR3 and the fourth transistor TR4 are controlled to be in a switched-on state, while the first auxiliary transistor TR_SUB1 and the second auxiliary transistor TR_SUB2 are controlled to be in a switched-off state. In this way, the first auxiliary transistor TR_SUB1 and the second auxiliary transistor TR_SUB2 can be isolated from the third transistor TR3 and the fourth transistor TR4.

As illustrated in FIG. 9, after the third switch SW3 and the fourth switch SW4 are switched off, by switching on the fifth switch SW5 and the sixth switch SW6, the voltage VDD of the voltage source of the comparator is supplied to the gate terminal of the first auxiliary transistor TR_SUB1 and the gate terminal of the second auxiliary transistor TR_SUB2.

In addition, as illustrated in FIG. 5, the first transistor TR1 and the second transistor TR2 may be NMOS transistors, and the third transistor TR3, the fourth transistor TR4, the first auxiliary transistor TR_SUM1, and the second auxiliary transistor TR_SUB2 may be PMOS transistors. In addition, as illustrated in FIG. 6 to FIG. 9, the first switch SW1 to the sixth switch SW6 may be PMOS transistors.

The image sensor may include a ramp signal generator configured to output ramp signals RAMP and a pixel array including a plurality of pixels, wherein the pixel array includes a plurality of column lines, and a CDS circuit is connected to each of the plurality of column lines. Sizes of the transistors included in the offset generator unit 10, in other words, the third transistor T3, the fourth transistor T4, the first auxiliary transistor TR_SUB1, and the second auxiliary transistor TR_SUB2 may have a slightly different value for each of the plurality of column lines. Accordingly, offset values of the CDS circuit connected to each of the column lines are different from each other as well. As a result, reset signal decoding times of the respective column lines can be prevented from being clustered into a single interval (for example, t5 in FIG. 1), thus preventing a peak current from flowing when decoding reset signals, and furthermore, an IR-drop/rise phenomena can be prevented from occurring in VDD and VSS voltages applied to a data bus.

The exemplary embodiments of the present inventive concept illustrated in FIG. 5 to FIG. 9 mismatches transistors included in a plurality of CDS circuits. Alternatively, according to another exemplary embodiment of the present inventive concept, by placing a signal delay unit in each of a plurality of CDS circuits connected to a plurality of column lines, control may be performed so that a different signal delay can be provided to each of at least two column lines among a plurality of column lines.

FIG. 10 to FIG. 14 are circuit diagrams, each illustrating parts of an image sensor according to exemplary embodiments of the present inventive concept.

Referring to FIG. 10 to FIG. 14, an image sensor according to an exemplary embodiment of the present inventive concept may include a pixel array including a plurality of pixels connected to a plurality of column lines, a ramp signal generator outputting ramp signals RAMP, a CDS circuit unit 100', and a signal delay unit 200. A sixth transistor TR6 may be connected between the CDS circuit unit 100' and the signal delay unit 200. A capacitor Cx and a transistor TRx may be connected between the CDS circuit unit 100' and the signal delay unit 200.

The CDS circuit unit 100' is connected to each of the plurality of column lines of the pixel array, compares pixel signals PIX output from the pixel array to ramp signals RAMP, and outputs compared output signals based on results of the comparisons. An output signal of the CDS circuit unit 100' may be denoted by OUT1_OUT in FIGS. 10 to 14. In exemplary embodiments of the present inventive concept described in FIG. 10 through FIG. 13, a switch S4 may be an auto-zero switch. The switch S4 may be turned on during an auto-zero period.

The signal delay unit 200 provides a different signal delay to each of at least two column lines among the plurality of the column lines. Illustrated in FIG. 10 to FIG. 14 are various configurations of the signal delay unit 200 according to exemplary embodiments of the present inventive concept. In exemplary embodiments of the present inventive concept described in FIG. 10 through FIG. 14, a user sets a delay time using the signal delay unit 200 separately provided, to artificially control the signal processing time of each CDS circuit unit 100'.

Figure 10:
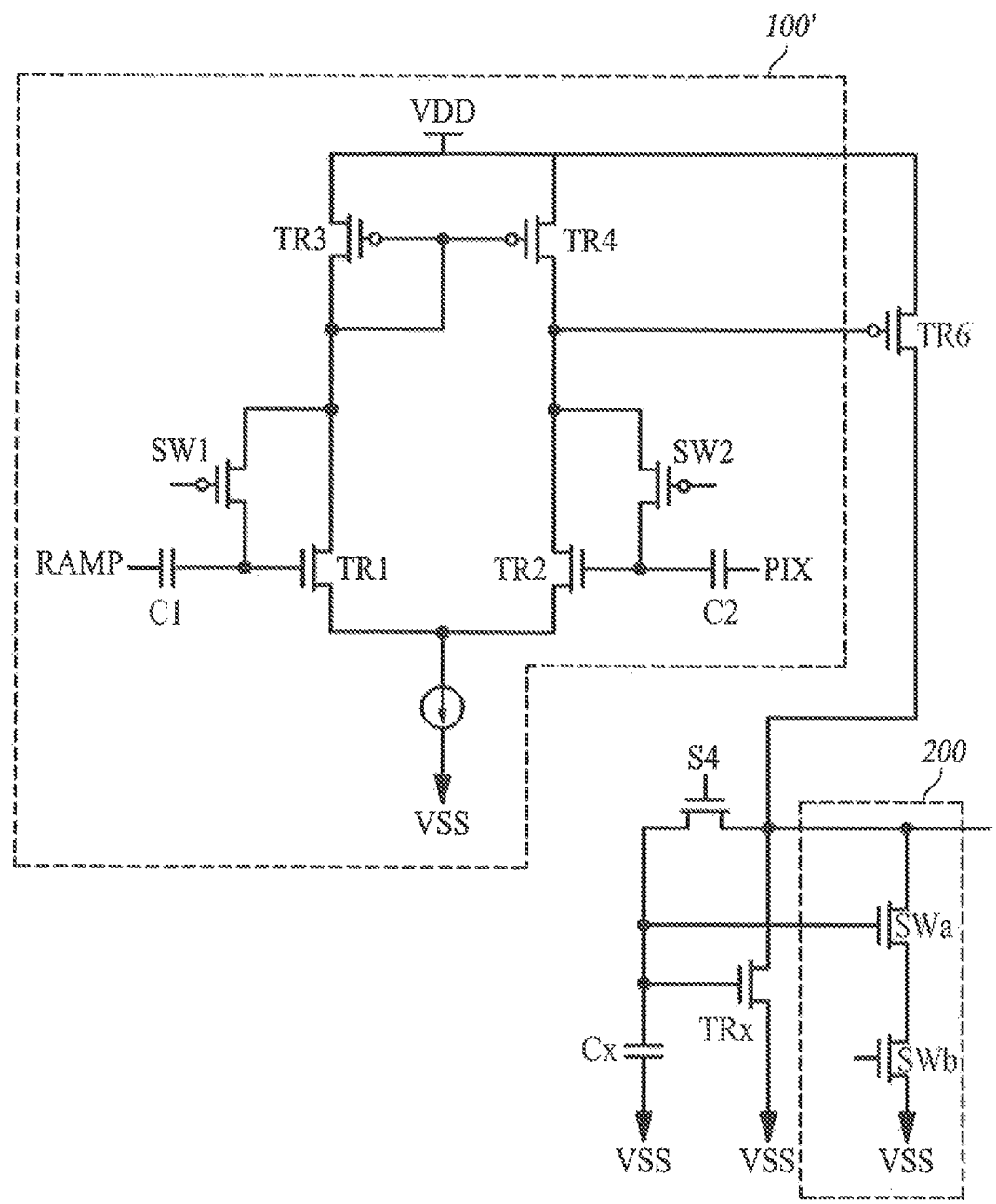
FIGS. 10, 11, 12, 13 and 14 are circuit diagrams, each illustrating a part of an image sensor according to exemplary embodiments of the present inventive concept.
Figure 11:
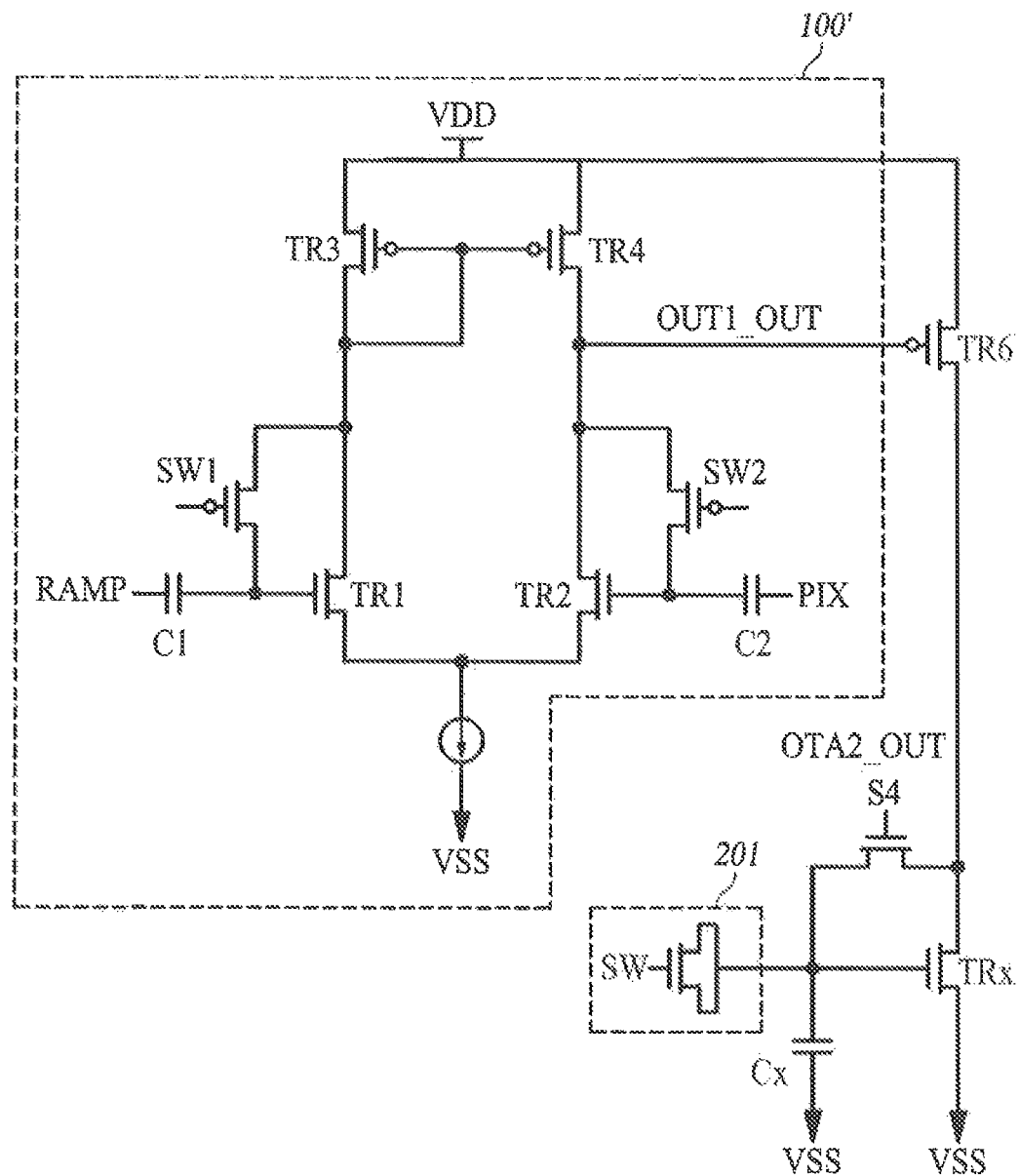
Figure 12:
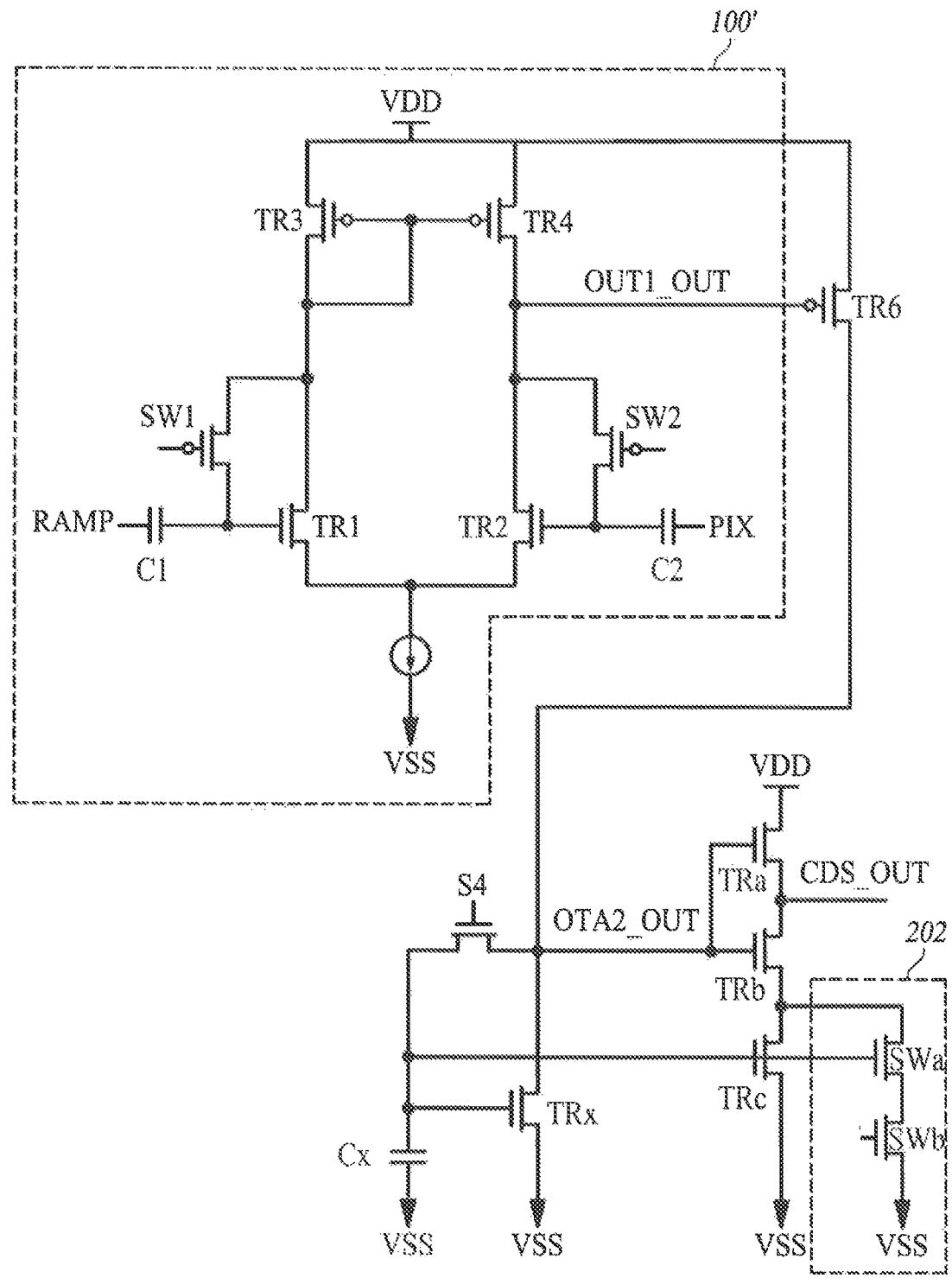
Figure 13:
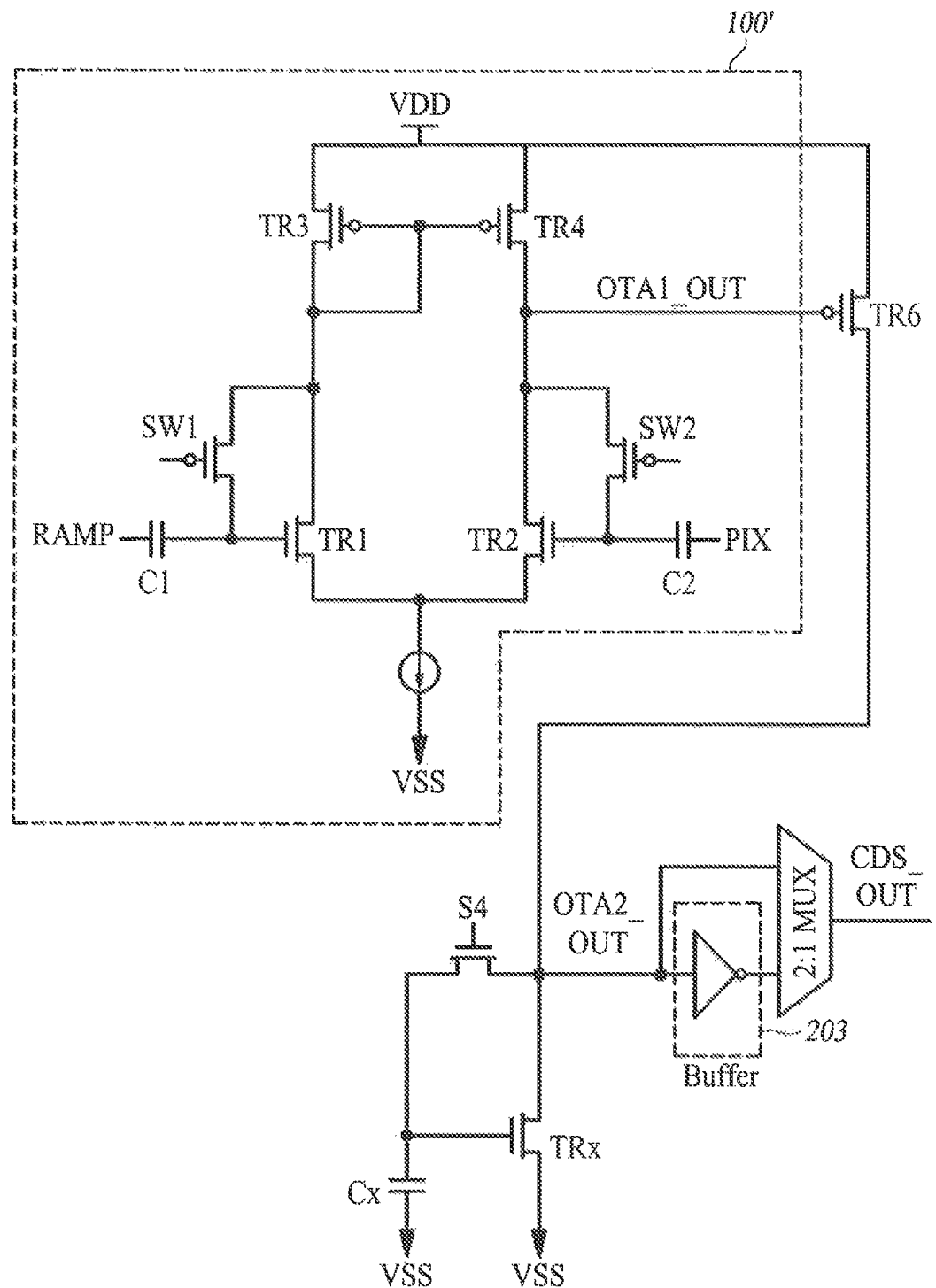

For example, in circuit configurations illustrated in FIG. 10 to FIG. 14, each of signal delay units 200, 201, 202, 203 and 204 is connected to an output terminal of the CDS circuit unit 100' to delay compared output signals. A delayed output signal may be denoted as CDS_OUT. For example, signal delay units 200 and 202 (including switches SWa and SWb), as illustrated in FIG. 10 or FIG. 12, may control signal processing times of the respective CDS circuits to differ from each other, by grouping a plurality of columns into two groups, e.g., even-numbered columns and odd-numbered columns, and switching each group on or off. In a similar manner, a signal delay unit 201 (including at least one switch SW) illustrated in FIG. 11 controls signal processing times of the respective CDS circuits to differ from each other by controlling each switch SW to be in a low or high state. In FIG. 13, a delay buffer 203 may be connected to each of even-numbered columns among a plurality of columns to delay the compared output signal, and the delay buffer 203 may not be connected to each of the odd-numbered columns. An output of the delay buffer 203 may be provided to a multiplexer along with a signal OUT2A_OUT. Therefore, the compared output signal may be bypassed in the odd-numbered columns, so that signal processing times of the respective CDS circuits are controlled to differ from each other. As another example, in a circuit configuration illustrated in FIG. 14, a signal delay unit 204 including a delay buffer is disposed at an input terminal of a CDS circuit unit to delay ramp signals RAMP. The signal delay unit 204 may be provided with a VLOAD and VLOAD may pass through a switch S before being delayed. In FIG. 12, several transistors TRa, TRb and TRc may also be connected between the CDS circuit unit 100' and the signal delay unit 202.

The exemplary embodiments of the present inventive concept include the case where a plurality of columns are grouped into two groups, e.g., even-numbered columns and odd-numbered columns. In addition, the exemplary embodiments of the present inventive concept also include a scheme in which a plurality of columns lines are grouped into N number of groups, and times for switching the switches SW on or off are controlled to vary signal processing times of the CDS circuit. In this scheme, the plurality of column lines include first to Nth column lines, and signal delays include first to Tth delays, which are each greater than 0 and are different from each other. In addition, the signal delay units 200 to 204 have the plurality of column lines grouped into T number of groups, and generate the first to Tth delays for each group of the T number of groups.

Figure 14:
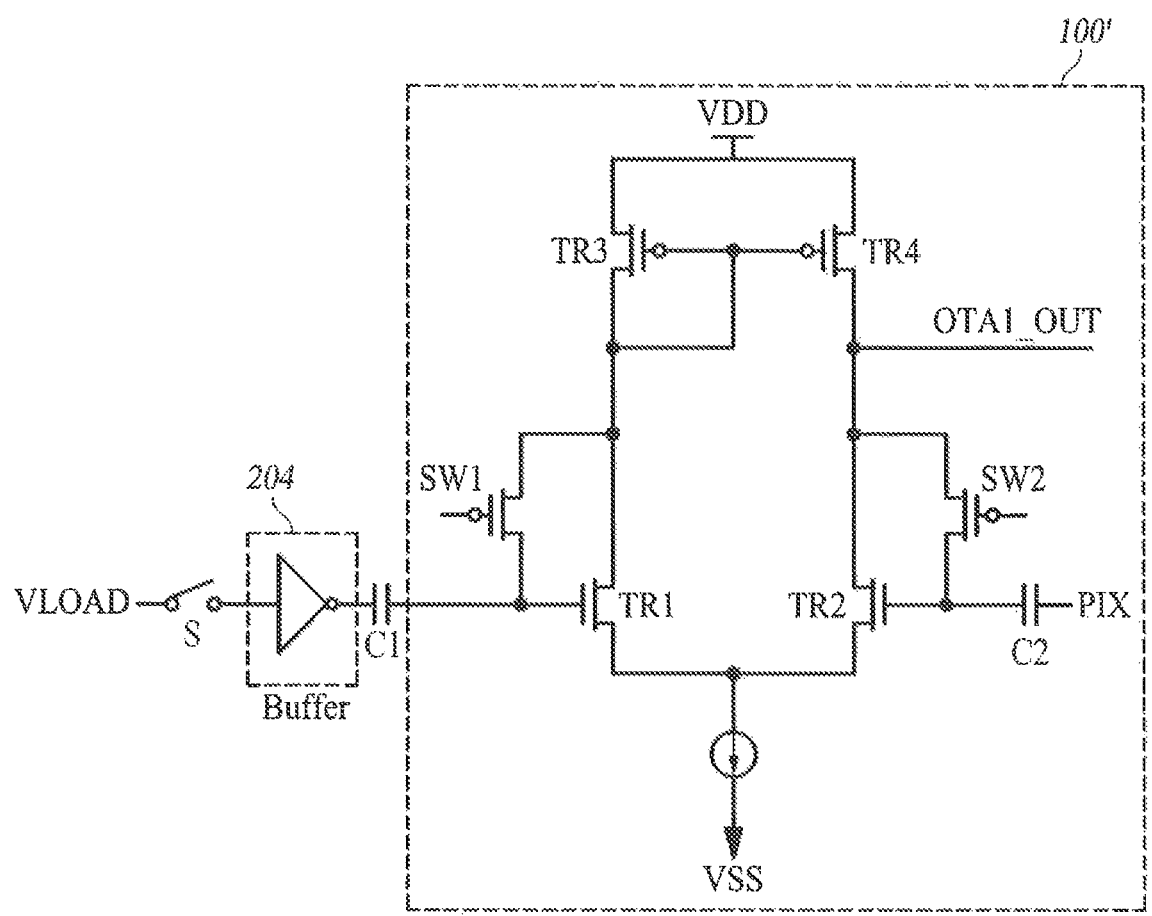

As illustrated in FIG. 10 to FIG. 12, the signal delay units 200 to 202 including the delay switches SW are switched on, or off at mutually different times for each group of the T number of groups, thereby varying the signal processing times in the CDS circuits. As illustrated in FIG. 13 and FIG. 14, the signal delay units 203 and 204 including the delay buffers, provide a different delay to each group in the T number of groups, and can be manufactured to include buffers of different sizes.

Figure 15:
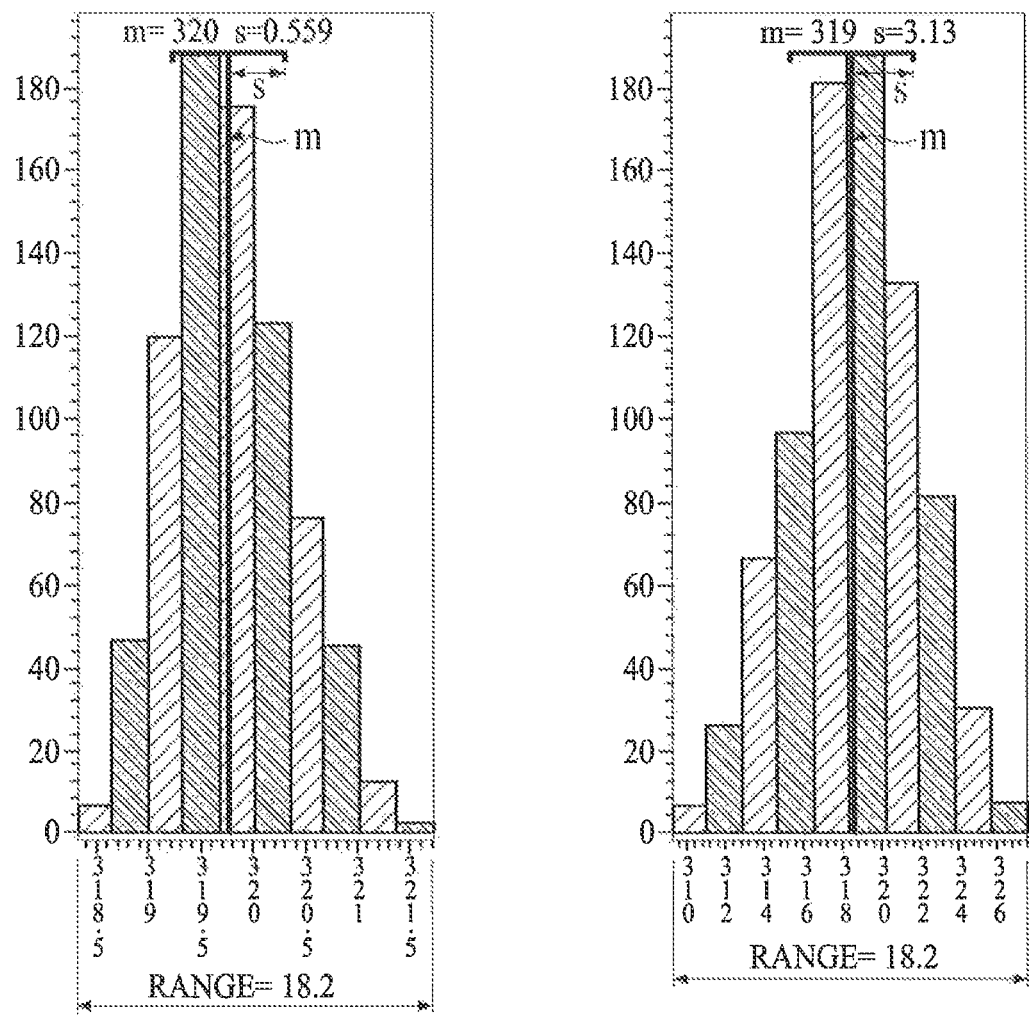
FIG. 15 is a graph illustrating reset codes when the exemplary embodiment of the present inventive concept of FIGS. 5 to 9 is or is not applied.
Figure 16:
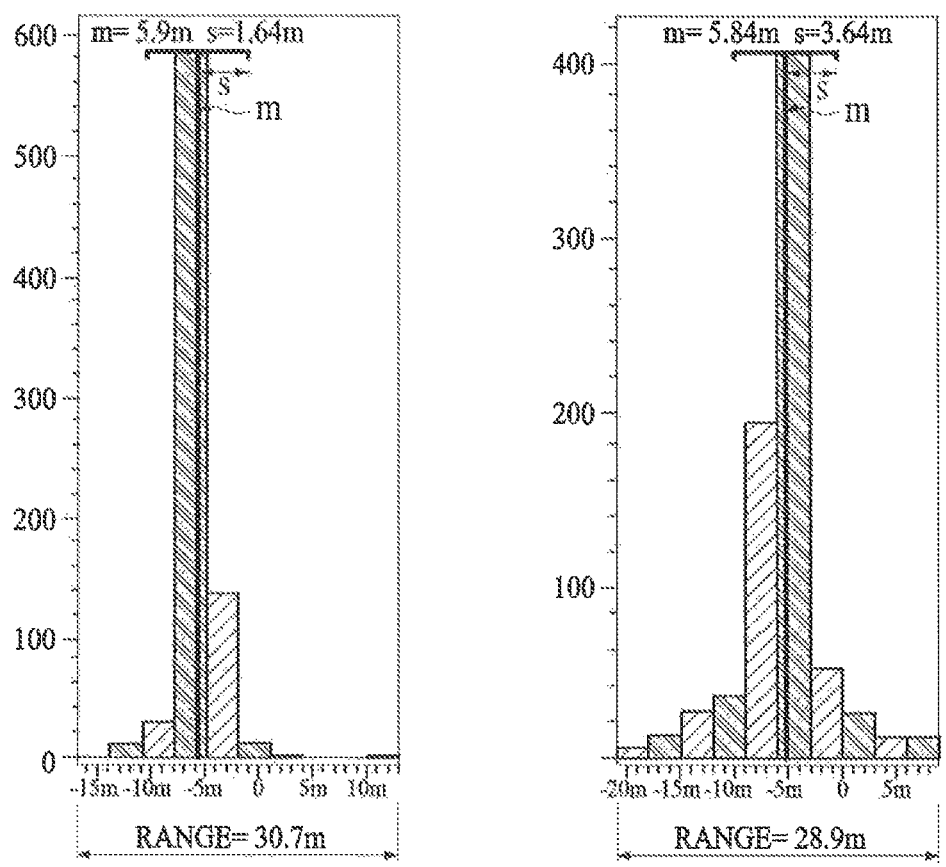
FIG. 16 is a graph illustrating a difference between image signals and reset signals when the exemplary embodiment of the present inventive concept of FIGS. 5 to 9 is or is not applied.

FIG. 15 includes graphs illustrating reset codes when the exemplary embodiment of the present inventive concept shown in FIGS. 5 to 9 is and is not applied; and FIG. 16 includes graphs illustrating a code representing a difference between image signals and reset signals, when the exemplary embodiment of the present inventive concept shown in FIGS. 5 to 9 is and is not applied.

The left graph in FIG. 15 illustrates a reset code when the embodiment according to FIGS. 5 to 9 is not applied. As can be seen from the left graph in FIG. 15, when a CDS circuit is operated offsetting an offset voltage of the comparator by performing an auto-zeroing in a conventional scheme, a time period in which signals are clustered is 0.559 LSB, which requires most of the signals to be processed within a short time period. Thus, current peaking and the subsequent IR-drop may arise when decoding reset signals.

The right graph in FIG. 15 illustrates a reset code when the embodiment according to FIGS. 5 to 9 is applied. As can be seen from the right graph in FIG. 15, when exemplary embodiments of the present inventive concept are applied, the time period in which most of the signals can be processed is increased to 3.13 LSB. Thus, current peaking and the subsequent IR-drop may be prevented from happening when decoding reset signals.

The left graph in FIG. 16 illustrates a code representing the difference between image signals and reset signals when the exemplary embodiment of the present inventive concept shown in FIGS. 5 to 9 is applied; and the right graph in FIG. 16 illustrates a code representing the difference between image signals and reset signals when the exemplary embodiment of the present inventive concept shown in FIGS. 5 to 9 is applied. As can be seen from FIG. 16, the difference between the image signals and the reset signals, when a scheme in accordance with exemplary embodiments of the present inventive concept is applied, is close to zero (1.64 mLSB and 3.64 mLSB), which is similar to when exemplary embodiments of the present inventive concept are not applied. This indicates that the exemplary embodiments of the present inventive concept may be applied without causing issues in the signal decoding function of a CDS circuit.

Figure 17:
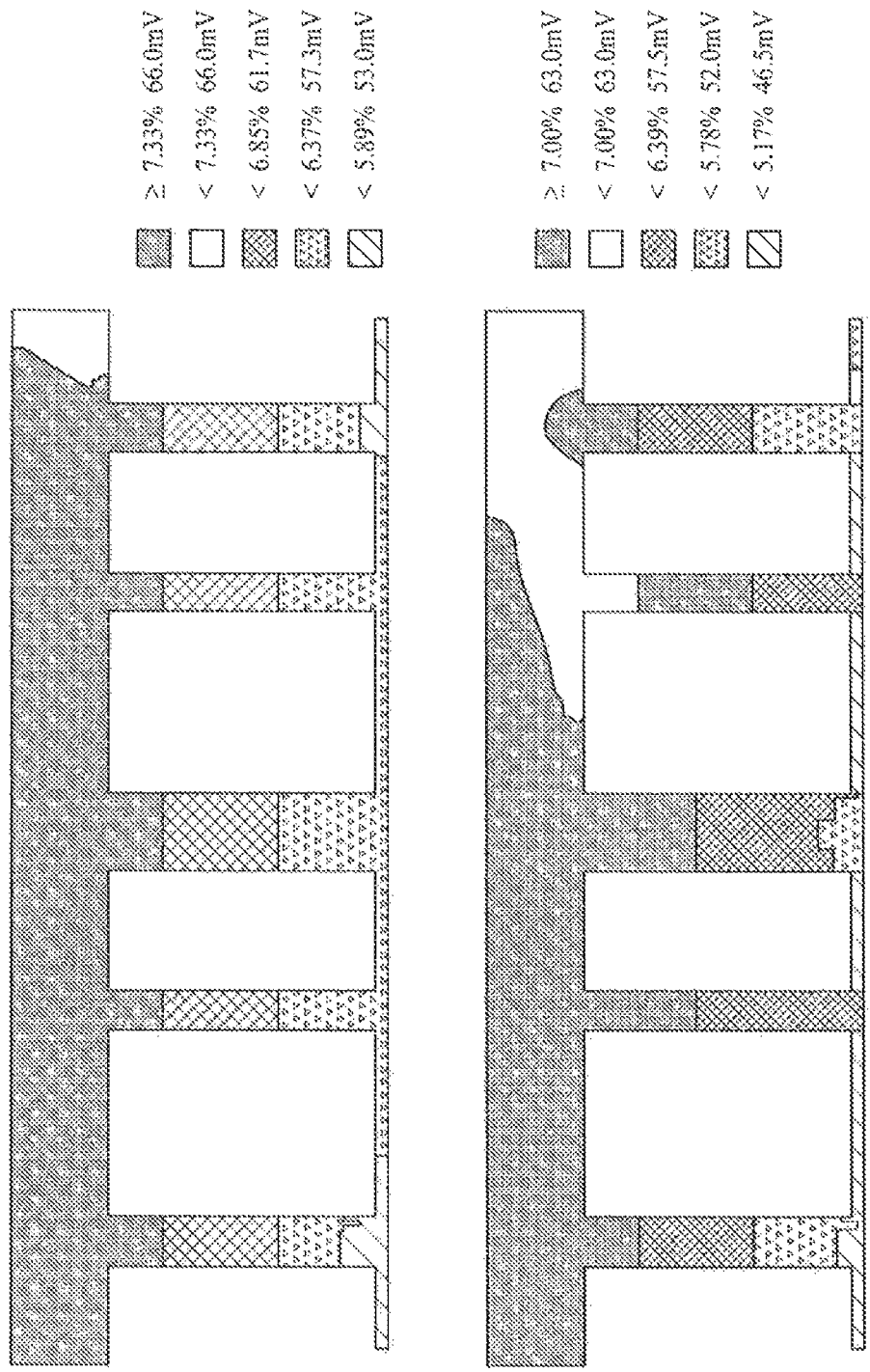
FIG. 17 is a diagram illustrating changes in VDD and VSS voltages when a CDS circuit according to exemplary embodiments of the present inventive concept is not applied.
Figure 18:
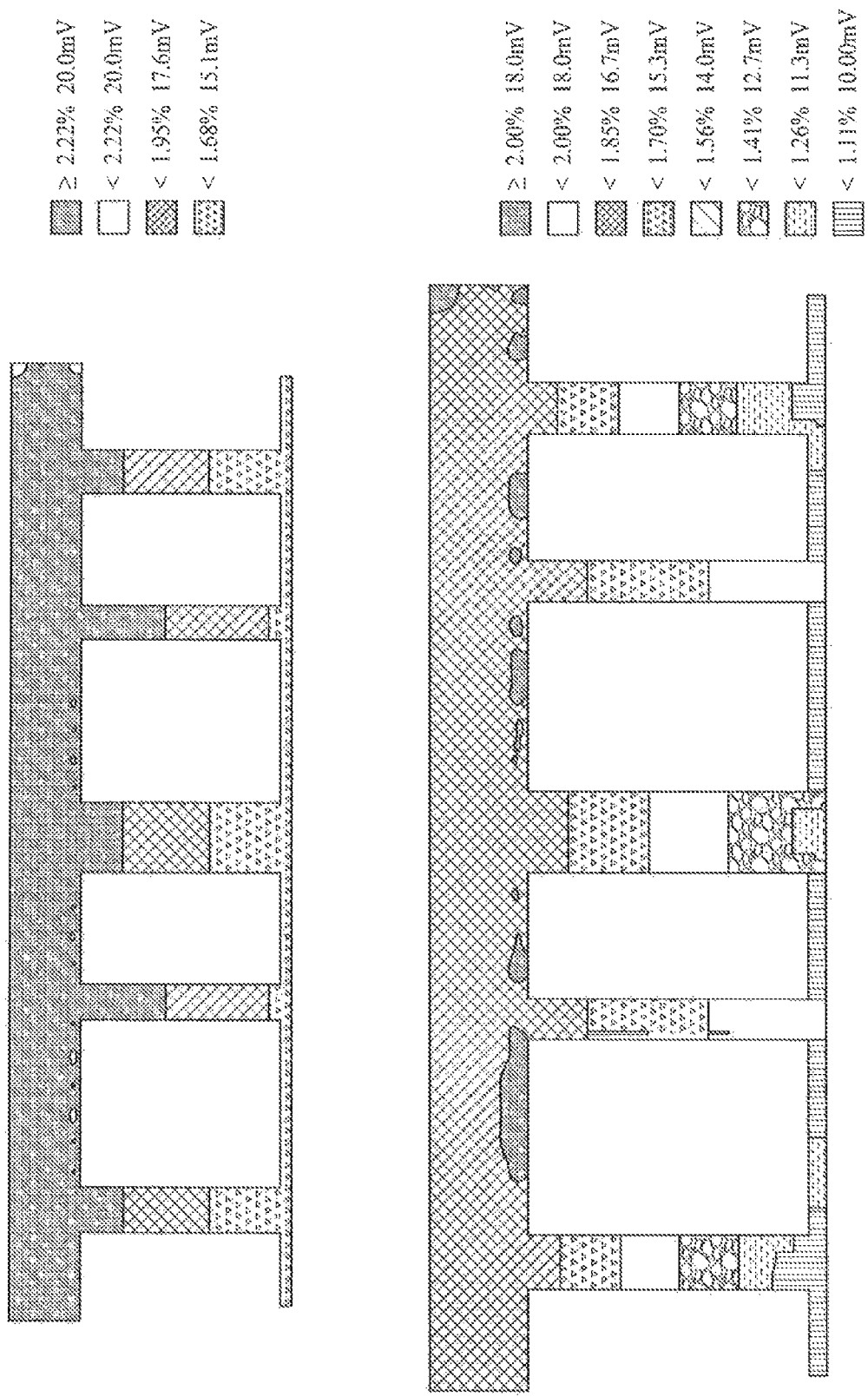
FIG. 18 a diagram illustrating changes in VDD and VSS voltages when a CDS circuit according to exemplary embodiments of the present inventive concept is applied.

FIG. 17 is a diagram illustrating changes in VDD and VSS voltages when a CDS circuit according to an exemplary embodiment of the present inventive concept is not applied, and FIG. 18 is a diagram illustrating changes in VDD and VSS voltages when a CDS circuit according to an exemplary embodiment of the present inventive concept is applied. In FIGS. 17 and 18, the top graph refers to changes in VDD and the bottom graph refers to changes in VSS.

As illustrated in FIG. 17, when the CDS circuit of the present inventive concept is not applied, degrees to which voltages inside the data bus dropped and rose were 86 mV and 106 mV, respectively, thus showing a total IR-drop value of 192 mV. In contrast, as illustrated in FIG. 18, when the CDS circuit of the present inventive concept is applied, degrees to which voltages inside the data bus dropped and rose are 42 mV and 63 mV, respectively, thus producing a total IR-drop value of 105 mV. In other words, it can be confirmed that when the CDS circuit of the present inventive concept is applied, the IR-drop was less severe compared to the IR-drop when the CDS circuit of the present inventive concept is not applied.

Figure 19:
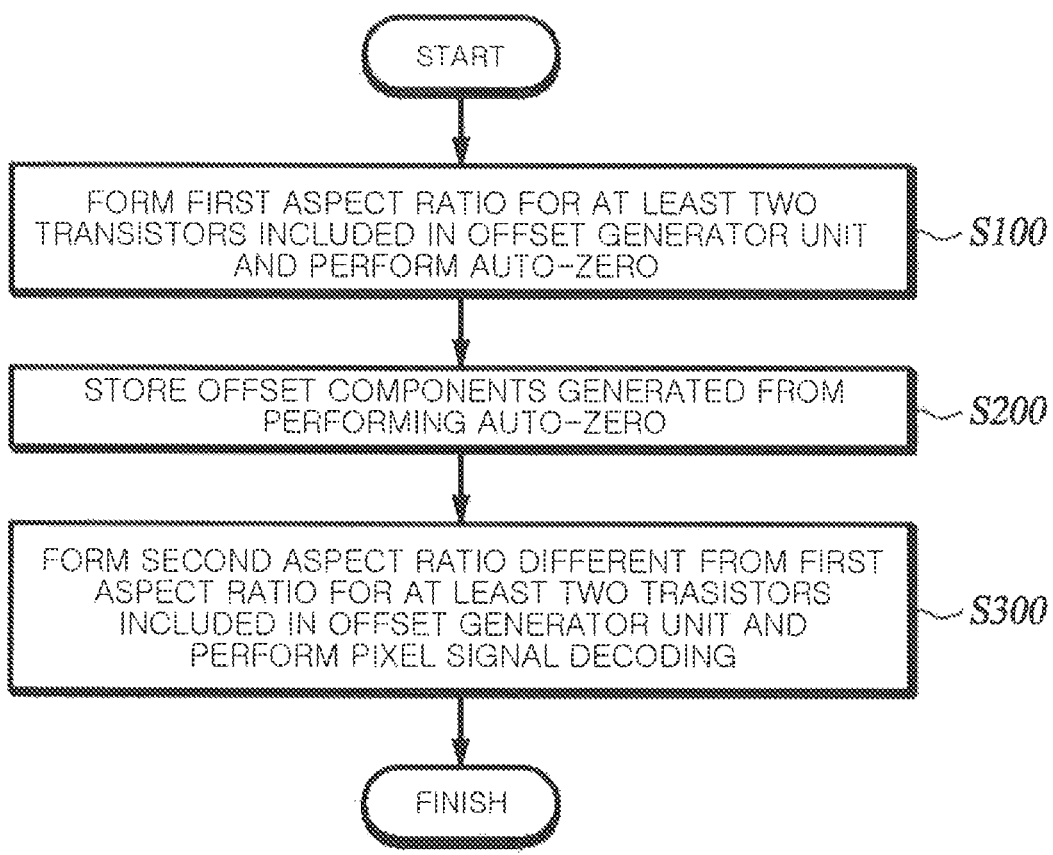
FIG. 19 is a flowchart illustrating a method for varying output signals in a CDS circuit according to an exemplary embodiment of the present inventive concept.

FIG. 19 is a method of varying output signals of a CDS circuit according to an exemplary embodiment of the present inventive concept.

According to an exemplary embodiment of the present inventive concept, a method for varying output signals in a CDS circuit may include: an operation of forming a first aspect ratio of at least two transistors included in an offset generator unit to perform an auto-zeroing S100; an operation of storing offset components generated by performing the auto-zeroing S200; and an operation of forming a second aspect ratio of the at least two transistors included in the offset generator unit to perform signal decoding, the second aspect ratio being different from the first aspect ratio S300.

As described with respect to FIG. 5 to FIG. 9, the first aspect ratio in the operation S100 may refer to an aspect ratio formed by the third transistor T3, the fourth transistor T4, the first auxiliary transistor TR_SUB1, and the second auxiliary transistor TR_SUB2; and the second aspect ratio in the operation S300 refers to an aspect ratio formed by the third transistor T3 and the fourth transistor T4. As described above, in the method for varying output signals in a CDS circuit according to an exemplary embodiment of the present inventive concept, by varying sizes, in other words, aspect ratios (W/L) of transistors included in the offset generator unit 10 in an auto-zeroing period and in a pixel signal decoding period, final offset components may be controlled to remain, thus preventing a current from peaking when reset signals are decoded and a subsequent IR-drop phenomenon.

An exemplary embodiment of the present inventive concept provides a CDS circuit capable of preventing IR-drop/rise phenomena that are likely to arise in high-resolution products, an image sensor including the same, and a method for varying output signals in a CDS circuit.

The term "unit", other words, "module" as used herein may mean, but is not limited to, a software or hardware component such as a field programmable gate array (FPGA) or an application specific integrated circuit (ASIC), and may performs certain tasks. A module may be configured to reside on an addressable storage medium and be configured to execute on one or more processors. Thus a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and module may be combined into fewer components and modules or further separated into additional components and modules. Additionally, the components and modules may be implemented to execute on one or more CPUs inside a device.

While the present inventive concept has been particularly shown and described with reference to exemplary embodiments thereof, it should be understood by those skilled in the art that various changes in form and detail may be made thereto without departing from the spirit and scope of the present inventive concept as set forth in the appended claims.

What is claimed is:

1. A correlated double sampling (CDS) circuit comprising a comparator,
    wherein the comparator includes:
    a signal input unit including a first transistor configured to receive a ramp signal and a second transistor configured to receive a pixel signal; and
    an offset generator unit connected to the signal input unit, the offset generator unit including at least two transistors,
    wherein in the offset generator unit, an aspect ratio of the at least two transistors in an auto-zeroing period and an aspect ratio of the at least two transistors in a pixel signal decoding period are different from each other.

2. The CDS circuit of claim 1, wherein the offset generator unit includes:
    a third transistor connected to the first transistor;
    a first auxiliary transistor connected in parallel to the third transistor;
    a fourth transistor connected to the second transistor; and
    a second auxiliary transistor connected to the fourth transistor in parallel.

3. The CDS circuit of claim 2, wherein the third transistor, the fourth transistor, the first auxiliary transistor, and the second auxiliary transistor are switched on in the auto-zeroing period.

4. The CDS circuit of claim 3, wherein in the pixel decoding period, the third transistor and the fourth transistor are switched on, and the first auxiliary transistor and the second auxiliary transistor are switched off.

5. The CDS circuit of claim 2, wherein a comparison node of the comparator is disposed at a point where the first transistor and the third transistor are connected to each other, and an output node of the comparator is disposed at a point where the second transistor and the fourth transistor are connected to each other.

6. The CDS circuit of claim 5, wherein the CDS circuit further includes: a first switch for connecting a gate of the first transistor to the comparison node; and a second switch for connecting a gate of the second transistor to the output node, wherein the auto-zeroing period is determined by on/off switching operations of the first switch and the second switch.

7. The CDS circuit of claim 2, further comprising:
    a first capacitor connected to a gate of the first transistor; and
    a second capacitor connected to a gate of the second transistor,
    wherein when the auto-zeroing period ends, offset components generated by the third transistor, the fourth transistor, the first auxiliary transistor, and the second auxiliary transistor, are stored in the first capacitor or the second capacitor.

8. The CDS circuit of claim 2, further comprising:
    a third switch for connecting a gate of the third transistor to a gate of the first auxiliary transistor; and
    a fourth switch for connecting a gate of the fourth transistor to a gate of the second auxiliary transistor.

9. The CDS circuit of claim 8, wherein the third switch and the fourth switch are switched on in the auto-zeroing period, and
    the third switch and the fourth switch are switched off, when the auto-zeroing period ends.

10. The CDS circuit of claim 9, further comprising:
    a fifth switch for connecting the gate of the first auxiliary transistor to a voltage source of the comparator; and a sixth switch for connecting the gate of the second auxiliary transistor to the voltage source of the comparator.

11. The CDS circuit of claim 10, wherein after the third switch and the fourth switch are switched off, the fifth switch and the sixth switch are switched on to supply a voltage of the voltage source of the comparator to the gate of the first auxiliary transistor and the gate of the second auxiliary transistor.

12. The CDS circuit of claim 10, wherein the first transistor and the second transistor are n-type metal oxide semiconductor (NMOS) transistors, and the third transistor, the fourth transistor, the first auxiliary transistor, the second auxiliary transistor, and the first to sixth switches are p-type semiconductor (PMOS) transistors.

13. An image sensor, comprising:
 a pixel array including a plurality of pixels connected to a plurality of column lines;
 a ramp signal generator for outputting a ramp signal;
 a correlated double sampling (CDS) circuit unit connected to each of the plurality of column lines, and configured to compare a pixel signal output from the pixel array and the ramp signal and to output compared output signals according to a result of the comparison; and
 a signal delay unit for providing different signal delays to at least two of the plurality of column lines.

14. The image sensor of claim 13, wherein the signal delay unit is connected to an output terminal of the CDS circuit unit to delay the compared output signals.

15. The image sensor of claim 13, wherein the signal delay unit is connected to an input terminal of the CDS circuit unit to delay the ramp signal.

16. The image sensor of claim 13, wherein the plurality of column lines include first to Nth column lines, the signal delays include first to Tth delays different from each other, and the signal delay unit groups the plurality column lines into T number of groups and generates the first to Tth delays for each of the T number of groups,
 wherein each of the first and Tth delays is greater than or equal to 0, and
 wherein each of N and T is an integer greater than or equal to 2, and N is greater than or equal to T.

17. The image sensor of claim 16, wherein the signal delay unit includes a delay switch, and the delay switch is switched on or off at different times for each of the T number of groups.

18. The image sensor of claim 16, wherein the signal delay unit includes a delay buffer, and the delay buffer provides different delays to each of the T number of groups.

19. A correlated double sampling (CDS) circuit comprising a comparator,
 wherein the comparator includes:
 a first circuit including a first transistor to receive a ramp signal and a second transistor to receive a pixel signal; and
 a second circuit including a third transistor connected to the first transistor and a fourth transistor connected to the second transistor,
 wherein an aspect ratio of the third and fourth transistors in an auto-zeroing period and an aspect ratio of the third and fourth transistors in a pixel signal decoding period are different from each other.

20. The CDS circuit of claim 19, wherein the comparator further includes:
 a first switch connected to a gate of the first transistor and a first node between the first transistor and the third transistor; and
 a second switch connected to a gate of the second transistor and a second node between the second transistor and the fourth transistor.

\* \* \* \* \*